United States Patent
Frank

(10) Patent No.: US 8,948,994 B2
(45) Date of Patent: Feb. 3, 2015

(54) ELECTROMECHANICAL BRAKING SYSTEM FOR AN AIRCRAFT

(71) Applicant: Messier-Bugatti-Dowty, Velizy-Villacoublay (FR)

(72) Inventor: David Frank, Velizy-Villacoublay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

(21) Appl. No.: 13/796,023

(22) Filed: Mar. 12, 2013

(65) Prior Publication Data

US 2013/0253736 A1 Sep. 26, 2013

(30) Foreign Application Priority Data

Mar. 21, 2012 (FR) .................................... 12 52541

(51) Int. Cl.
*B60T 7/12* (2006.01)
*B60T 8/17* (2006.01)
*B64C 25/42* (2006.01)
*B60T 8/88* (2006.01)
*B60T 13/74* (2006.01)

(52) U.S. Cl.
CPC ............. *B64C 25/426* (2013.01); *B60T 8/1703* (2013.01); *B60T 8/885* (2013.01); *B60T 13/741* (2013.01); *B60T 2270/402* (2013.01)
USPC .......... 701/76; 701/3; 701/71; 701/75; 303/3; 303/15; 303/20; 303/126; 244/111; 244/110 A

(58) Field of Classification Search
CPC ............... B60T 7/00; B60T 8/00; B60T 8/17; B60T 8/1701; B60T 8/1703; B60T 8/32; B60T 8/325; B60T 2201/00; B64C 25/426; B64C 25/44
USPC ......... 701/3, 9, 10, 14, 16, 36, 41, 48, 70, 71, 701/75–79, 81, 83; 340/948, 426.32, 340/426.33, 453; 303/2–4, 13, 20, 199; 73/121, 129
See application file for complete search history.

(56) References Cited

U.S. PATENT DOCUMENTS

| | | | |
|---|---|---|---|
| 6,183,051 B1 * | 2/2001 | Hill et al. ....................... 303/126 |
| 6,296,325 B1 * | 10/2001 | Corio et al. ...................... 303/20 |
| 6,390,571 B1 * | 5/2002 | Murphy ........................ 303/126 |
| 7,128,376 B2 * | 10/2006 | Williams et al. ................ 303/15 |
| 7,213,891 B2 * | 5/2007 | Sibre .............................. 303/20 |
| 7,866,761 B2 * | 1/2011 | Gerum et al. ................. 303/9.61 |
| 2004/0239173 A1 * | 12/2004 | Williams et al. .................. 303/3 |
| 2006/0152073 A1 | 7/2006 | Sibre |
| 2010/0106347 A1 * | 4/2010 | Cahill ............................... 701/3 |
| 2011/0079471 A1 * | 4/2011 | Colin et al. ................ 188/106 P |
| 2013/0253736 A1 * | 9/2013 | Frank ............................... 701/3 |

FOREIGN PATENT DOCUMENTS

EP   1 681 220 A1   7/2006
GB      2470251 A  11/2010

* cited by examiner

*Primary Examiner* — Thomas Tarcza
*Assistant Examiner* — Tyler J Lee
(74) *Attorney, Agent, or Firm* — Sughrue Mion, PLLC

(57) ABSTRACT

The invention relates to an aircraft braking system having brakes with electromechanical braking actuators (103) adapted to press selectively against associated stacks of disks in order to generate a braking torque on associated wheels of the aircraft; at least one control module (130) receiving braking setpoints and responding by generating a braking command (121); and at least one power module (120) responding to the braking command by delivering AC power to the motors of actuators connected to the power module so that the motors develop a braking force corresponding to the braking setpoints. According to the invention, the control module includes a digital processor stage (131) and an analog processor unit (135).

4 Claims, 4 Drawing Sheets

ELECTROMECHANICAL BRAKING SYSTEM FOR AN AIRCRAFT

The invention relates to an electromechanical braking system for an aircraft.

TECHNOLOGICAL BACKGROUND OF THE INVENTION

Braking system architectures for aircraft are known that comprise:
- brakes having electromechanical actuators for selectively applying a braking force on respective stacks of disks in order to exert a braking torque on respective wheels;
- at least one power module for sending electrical power to the electromechanical actuators in order to enable them to exert a braking force;
- at least one control module for controlling the power module in response to braking setpoints so that the appropriate alternative current (AC) power delivered to the actuators enable them to develop the desired braking force; and
- at least one power supply unit having means for generating a high voltage from an electrical power bus of the aircraft and/or from a battery of the aircraft in order to supply the power module with the high power needed for powering the actuators.

In general, the control module and the power module are grouped together in a controller known as an electromechanical actuator controller (EMAC). The EMAC generally incorporates control over a locking member of the electromechanical actuator in order to lock it in position for the purpose of providing a parking brake, which member requires only low voltage for its actuation.

The power supply unit generally comprises one or more converters (e.g. transformers) suitable for transforming the power delivered by the power bus of the aircraft or from its battery into calibrated high voltage power for satisfying the calls for high power generated by the power module of the EMAC.

The commands delivered by the control module to the power module are prepared on the basis of various braking setpoints that come in particular from a braking computer that performs the auto-brake function and that implements anti-slip protection, and also from brake pedals or from a parking brake selector.

The entire braking system of the aircraft is generally designed to operate in three modes: a normal mode; an emergency mode; and a parking brake mode.

In the normal mode, the control module generates a command for the power module as a function of a digital braking setpoint it receives from the braking computer.

In the emergency mode, in which the braking computer has failed, the control module generates a command for the power module as a function of an analog braking setpoint, specifically pedal signals representative of the extent to which the brake pedals have been pressed in as actuated directly by the pilot.

In parking brake mode, which has priority over the other modes, the control module generates a parking brake command in response to a discrete parking brake setpoint issued when the pilot actuates a parking brake selector. In order to enable parking brake to be maintained even when the aircraft is not operating, the actuators are fitted with a fail-safe brake that, when not electrically powered, locks the pusher in position.

A complete braking system for an aircraft having four brake wheels is illustrated for example in document U.S. Pat. No. 6,296,325.

The EMACs are supplied with high power by power supply units delivering high voltage direct current (HVDC) power. The power supply units are preferably fitted with respective power switches that are controlled as a function of the braking setpoints in order to place such a switch in an on state only if braking is actually required, as disclosed in document FR 2 857 642.

In that type of architecture, EMACs receive digital braking setpoints from braking calculators. At least some of the EMACs also receive analog or discrete devices from pedals or from a parking brake selector. The digital setpoint corresponds to normal braking, while the analog or discrete signals make emergency braking or parking brake possible.

OBJECT OF THE INVENTION

The invention seeks to propose a simplified braking system for an aircraft.

BRIEF SUMMARY OF THE INVENTION

The invention provides an aircraft braking system comprising:
- brakes with electromechanical braking actuators adapted to press selectively against associated stacks of disks in order to generate a braking torque on associated wheels of the aircraft;
- at least one control module receiving braking setpoints and responding by generating a braking command; and
- at least one power module responding to the braking command by delivering AC power to the motors of actuators connected to the power module so that they develop braking forces corresponding to the braking setpoints.

According to the invention, the control module comprises:
- a digital processor stage comprising at least one digital processor unit for implementing complex relationships for controlling the actuators to generate a first braking command in response to digital braking signals; and
- an analog processor stage comprising at least one programmable logic circuit for at least:
  - receiving and conditioning the digital braking setpoints coming from at least one digital communications bus in order to send them to the digital processor stage so that it generates the first braking command;
  - receiving and conditioning analog or discrete braking setpoints;
  - implementing simple actuator control relationships in order to generate a second braking command in response to the analog or discrete braking setpoints; and
  - selecting one of the first and second braking commands in response to an external selection order in order to send the selected command to the power module.

Thus, the digital processor stage serves to implement complex braking relationships including anti-slip protection for the purpose of generating a first command in response to a digital braking setpoint issued by a braking computer. This is normal braking mode.

The analog processor stage serves both to condition the various braking setpoints, and to generate a second command in application of simplified relationships that nevertheless make it possible, in the event of the braking computers failing, to retain a certain capacity for braking. By means of the provisions of the invention, it is thus possible to continue to provide emergency braking using the pedals on their own, while still conserving a capacity for differential braking that may assist in steering the aircraft on the ground.

One or the other of the commands is selected either automatically by a selection order being sent by the braking computer to give precedence to the first command so long as the computers are operating properly, and switching to the second command as soon as a computer failure is identified. This selection may also be performed manually by the pilot.

A control relationship is said to be "simple" when the control relationships can be implemented by a programmable logic circuit. These relationships do not incorporate anti-slip or anti-jamming protection. In the limit, such control relationships need be no more than a mere copy of the analog signals from the pedals or the discrete signal from the parking brake selector.

A relationship is said to be "complex" when the relationship implements in particular protection against slip or against jamming. For this purpose, the digital processor unit receives information about the speed of rotation of the wheels via the digital networks 6. This type of processing requires calculation to be performed at high speed and implements strategies that have been prepared to relax the braking force generated by the actuators if the associated wheel begins to jam.

In a first arrangement of the braking system of the invention, the control module and the power module are grouped together in the same piece of equipment, referred to as a controller or EMAC.

In a second arrangement of the braking system of the invention, the analog processor stage has at least two sub-stages or cards, including a first that is incorporated in the power supply unit and a second that is incorporated with the power module in a controller or EMAC, the first sub-stage serving to acquire analog and discrete signals, to control the power switch, and to implement simple control relationships for generating the second command for the power module, while the second sub-stage serves to acquire and condition digital braking setpoints, to receive the second command, and to select between the first command prepared by the digital stage and the second command.

In a third arrangement of the braking system of the invention, the control module is separate from the power module and is incorporated in the power supply unit. The controller or EMAC is then no more than the power module which may be arranged as close as possible to the undercarriages carrying the brake wheels. Thus, the only information connection between the power supply unit and the power module is the connection enabling the command to be sent to the power module.

BRIEF DESCRIPTION OF THE FIGURES

The invention can be better understood in the light of the following description of particular embodiments of the invention described with reference to the figures of the accompanying drawings, in which.

DETAILED DESCRIPTION OF EMBODIMENTS OF THE INVENTION

Figure 1:
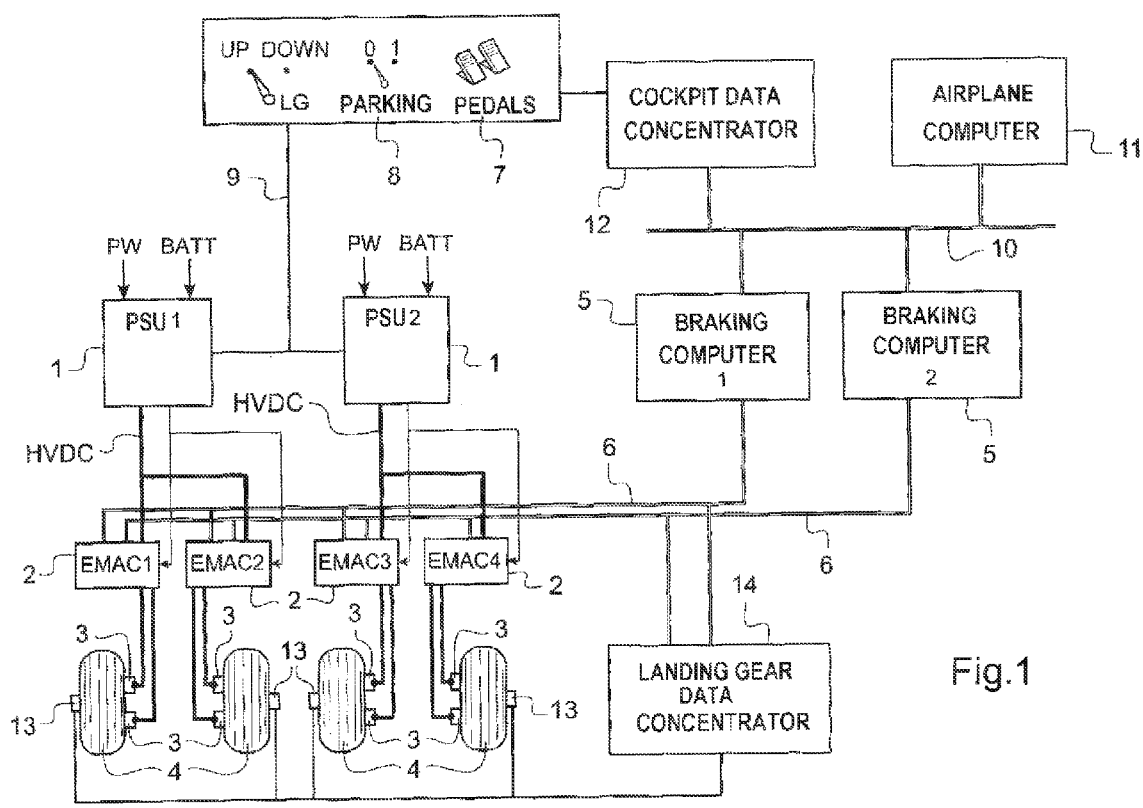
FIG. 1 is a diagram of a braking system architecture in a first particular embodiment of the invention, in application to an aircraft having four braked wheels.

The invention is described initially with reference to FIG. 1. In this figure, high power connections are drawn using bold lines, and information connections are drawn using fine lines, single lines for analog or discrete connections and pairs of lines for digital connections.

Concerning high power, the braking system of the invention has power supply units 1 adapted to generate HVDC power from the power sources of the aircraft, e.g. the 270 volts AC (V AC) network that is referenced PW, or the battery BATT.

The high power HVDC is delivered to controllers or EMACS 2, comprising, as described in detail below, respective power modules incorporating at least one inverter in order to convert the HVDC power as delivered in this way into AC power for the motors of electromechanical braking actuators 3 fitted to brakes associated with the brake wheels 4 of the aircraft.

The power module is controlled by a control module that may be incorporated in an EMAC, or in the power supply unit, or indeed that may be shared between both of them, as described in greater detail below, and that, for this purpose, receives digital braking setpoints from braking computers 5 and conveyed by digital data buses 6, together with analog or discrete signals coming from brake pedals 7 or from a parking brake selector 8 and conveyed over an analog channel 9.

In order to generate the digital braking setpoints, the braking computers 5 are connected by a data bus 10 of the aircraft to at least one aircraft computer 11 delivering data such as the speed of the aircraft, and whether or not the aircraft is on the ground. The braking computers 5 also receive analog pedal signals 7 or parking brake selector signals 8 that, in this example, are connected and digitized for this purpose by a cockpit data concentrator 12, together with signals coming from tachometers 13 arranged on the braked wheels, with the signals therefrom likewise being collected and digitized in this example by landing gear data concentrators 14. Nevertheless, the use of data concentrators is not essential in the context of the invention.

Figure 2:
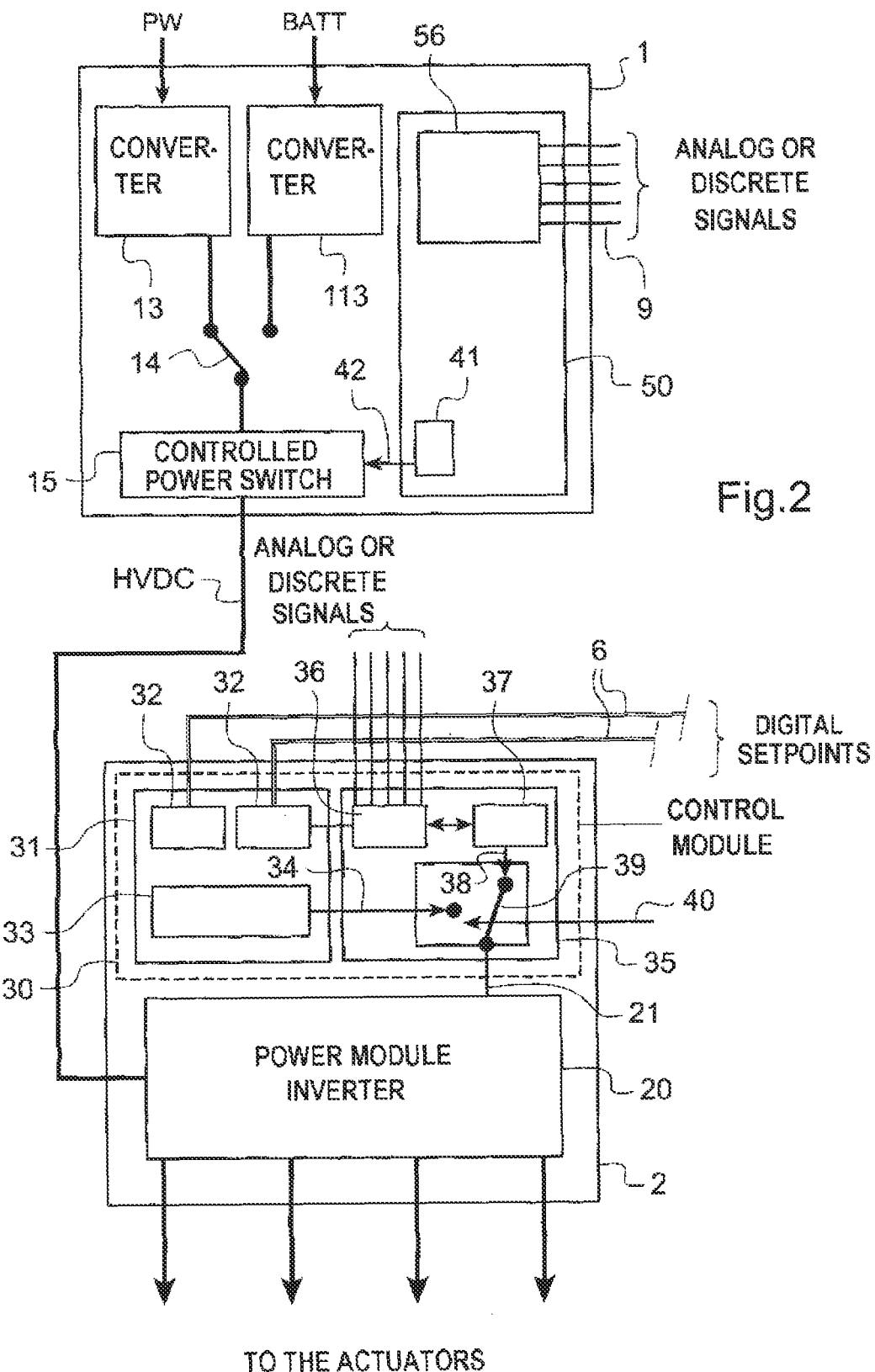
FIG. 2 is an enlargement of the FIG. 1 diagram showing in particular a power supply unit and an EMAC that are connected together.

The way in which these various signals are used for controlling braking is described in greater detail below with reference to a first particular embodiment shown in FIG. 2.

Each power supply unit 1 has converters 13 for converting electricity coming from a power bus of the aircraft or from its battery into a high power signal at constant voltage HVDC. A power switch 14 serves to select the source of power. The power supply unit 1 is provided with a controlled power switch 15 enabling the power supply to the EMACs to be switched off, and to authorize power to be connected thereto only when braking is actually being requested, so as to avoid any untimely braking.

The high power HVDC is delivered to a power module 20 incorporated in the EMAC 2. The power module 20 essentially comprises inverters that are adapted to generate AC power for the motors of electromechanical braking actuators. The power module 20 is controlled by a braking command 21 that is prepared by a control module 30.

In the embodiment shown, the control module 30 is outlined by a dashed line, and in this example is contained in full in the EMAC 2.

The control module 30 has a digital stage 31 that includes connection means 32 connected to the digital buses 6 conveying the digital braking setpoints prepared by the braking computers 5, and is also connected to a digital processor unit 33 (e.g. a processor or CPU associated with memories) serving to implement complex relationships in order to prepare a first braking command 34.

The control module 30 also has an analog stage 35 that includes input/output means 36 for receiving analog or discrete signals, e.g. coming from the pedals or from the parking brake selector. The analog stage 35 also has at least one programmable logic circuit 37 for conditioning said signals and for deducing therefrom a second command 38 for the power module 20 by implementing simple braking relationships that can be implemented with the help of logic gates.

The term "simple" relationships is used herein to mean relationships that can be implemented by a programmable logic circuit. For example, if the analog stage receives signals coming from the pedals, the logic circuit should be programmed to generate a braking setpoint that includes components that are proportional to said signals, and that are suitable for being used to implement differential braking. Thus, an advantageous emergency braking mode is obtained in which the pilot can determine the amount of braking by pressing on the pedals and can also perform differential braking in order to assist in steering the aircraft by pressing in differential manner on the pedals. Nevertheless, the pilot does not benefit from anti-slip or anti-jamming protection.

Furthermore, on receiving a discrete signal coming from the parking brake selector, the programmable logic circuit may also engage a parking brake procedure in which it begins by unlocking the pushers of the actuators, then controlling them to apply a parking brake force, and finally locking the actuators in position.

In order to control the power switch 15 of the power supply unit 1, it is necessary to provide an analog card 50 in the power supply unit 1, which card includes input/output means 56 for receiving the analog or discrete signals for the purpose of controlling the power switch 15, e.g. by means of a programmable logic circuit 41.

Figure 3:
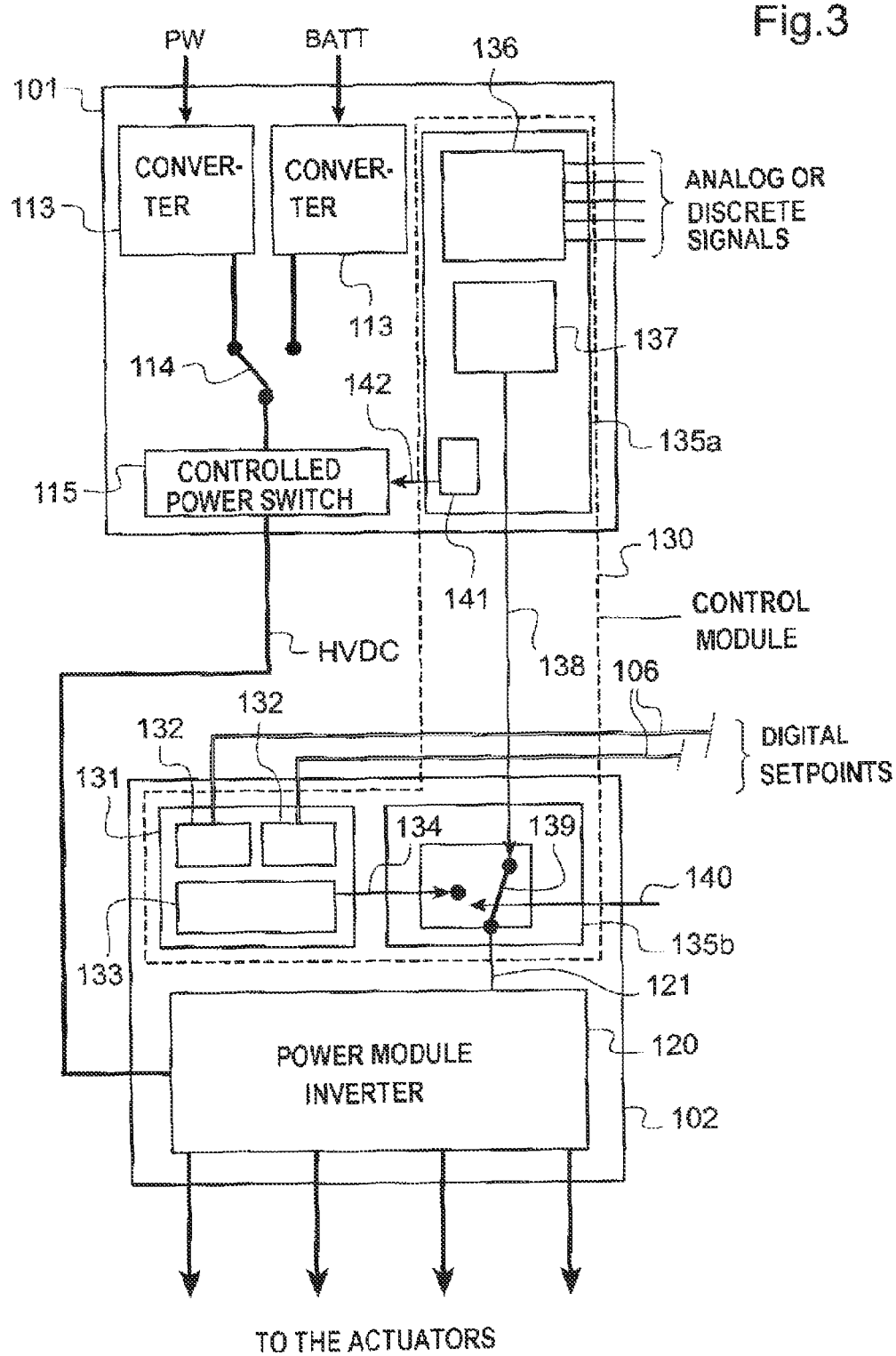
FIG. 3 is a figure analogous to FIG. 2 showing a variant embodiment of the invention.

In a second embodiment shown in FIG. 3, in which elements that are common with the above-described embodiments have the same references plus one hundred, the control module 130 is shown surrounded by dashed lines, and in this example is shared between the power supply unit 101 and the EMAC 2.

The control module 130 has a digital stage 131 that includes connector means 132 for connection to the digital buses 106 conveying the digital braking setpoints prepared by the braking computers 105, and to a digital processor unit 133 (e.g. a processor or CPU associated with memories) for implementing complex relationships in order to prepare a first braking command 134.

The control module 130 also includes an analog stage 135 with a first card 135a arranged in the power supply unit 101 and having input/output means 136 for receiving analog or discrete signals, e.g. coming from the pedals or from the parking brake selector. The first card 135a also includes at least one programmable logic circuit 137 for conditioning said signals and for deducing a second command 138 therefrom for controlling the power module 120 by implementing simple braking relationships that can be implemented with the help of logic gates.

The analog stage 135 also includes a second card 135b that is arranged in the EMAC 2 and that includes a switch 139 receiving the first command 134 and the second command 138 and serving to select which one of those commands is finally delivered to the power module 120, as a function of an external signal 140. The switch 139 is preferably controlled by the programmable logic circuit 137.

The first card 135a of the analog module 135 also includes a second programmable logic circuit 141 adapted to generate a command 142 for the power switch 115, e.g. as described in document FR 2 857 642.

Thus, the analog braking signals are acquired in the power supply unit for controlling the power switch 115 and for preparing the second command of the power module, with only the second command being forwarded to the EMAC 102, thereby considerably simplifying the structure of both units, i.e. both the EMAC which then comprises only essentially a digital core with very few analog inputs/outputs, and also the power supply module, which must in any event acquire braking information (from the pedals and the parking brake selector) as provided by the module 136 in order to determine the state of the power switch 115, and which thus conserves practically the same inputs/outputs without additional complexity. Only a few additional logic circuits are needed for generating the second command, these logic circuits being implemented in the programmable component 137.

Figure 4:
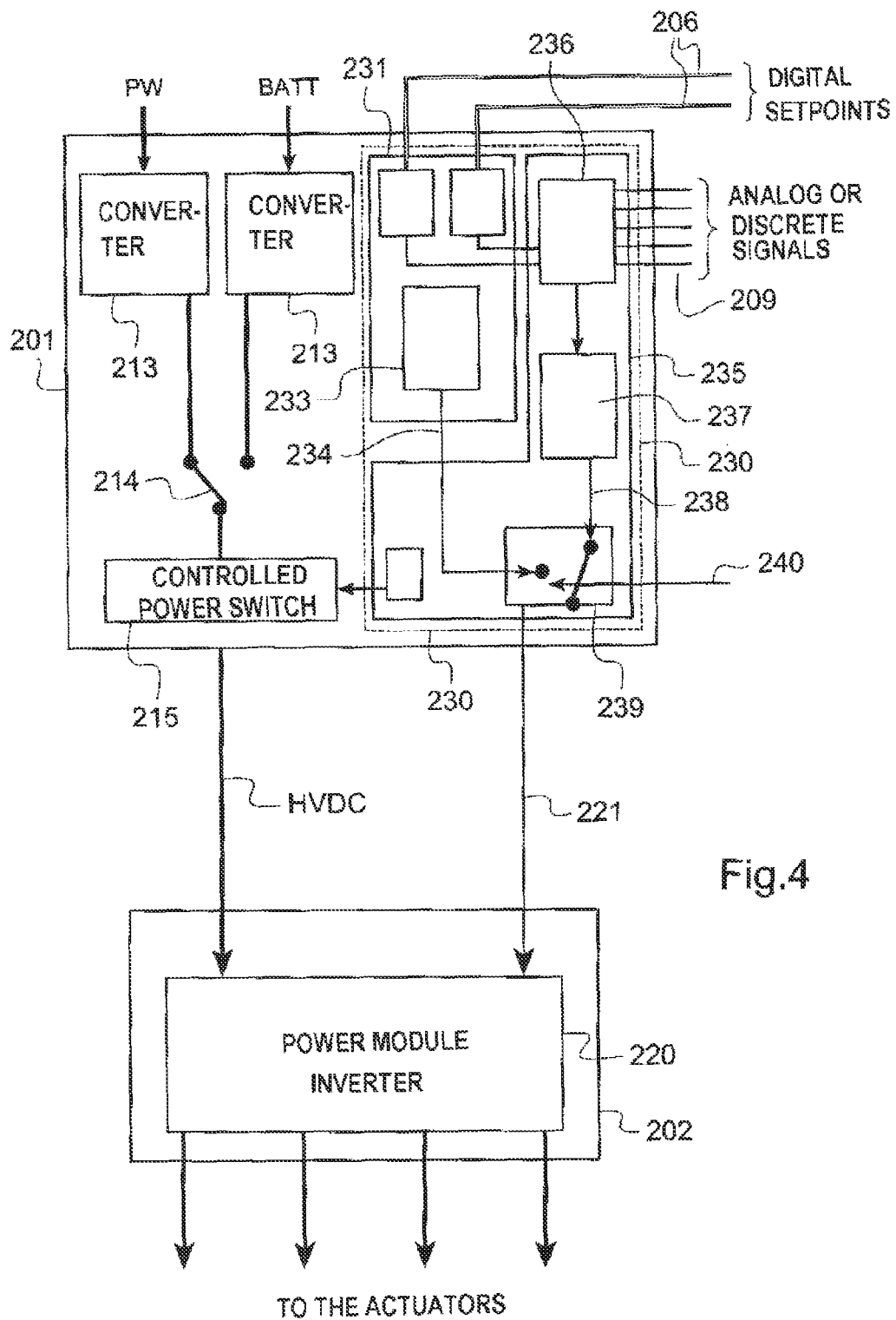
FIG. 4 is a figure analogous to FIG. 2 showing a variant embodiment of the invention.

With reference to the third embodiment shown in FIG. 4, where references for elements that are common with those shown in FIG. 3 are increased by one hundred, the control module 230 is contained fully in the power supply unit.

There can be seen the digital stage 231 and the analog stage 235, which carries means for controlling the power switch 215. In this embodiment, it can be seen that the only input/output of the EMAC is for the braking command 221 as selected by the switch 239, thereby considerably simplifying the design of the EMAC, but without making the power supply unit excessively complex, given that the analog and discrete signals must in any event be acquired in order to control the power switch 215.

In the three embodiments that are shown, the first braking command or the second braking command is selected with the help of an external order, which may come for example from the braking computers, or from a selector operated manually by the pilot of the aircraft.

The invention is not limited to the above description, but on the contrary covers any variant coming within the ambit defined by the claims.

The invention claimed is:

1. An aircraft braking system comprising:
   a plurality of brakes with electromechanical braking actuators (3), each one of said electromechanical braking actuators (3) being adapted to press selectively against associated stacks of disks in order to generate a braking torque on associated wheels of the aircraft;
   at least one control module (30; 130; 230) configured for receiving braking setpoints and responding by generating a braking command (21; 121; 221); and
   at least one power module (20; 120; 220) configured for responding to the braking command by delivering AC power to the motors of actuators connected to the at least one power module so that said actuators develop braking forces;
   the system being characterized in that the control module comprises:
   a digital processor stage (21; 131; 231) comprising at least one digital processor unit (33; 133; 233) configured for:
   receiving digital braking setpoints from at least one digital communications bus;
   implementing complex relationships for controlling the actuators to generate a first braking command in response to the digital braking setpoints (6; 106; 206); and an analog processor stage (35; 235) comprising at least one programmable logic circuit (37; 137; 237) for at least receiving analog or discrete braking setpoints (9; 109; 209), and deducing therefrom a second braking command (38; 138; 238) by implementing simple relationships for controlling the actuators;

the control module (30; 130; 230) being further configured for selecting one of the first and second braking commands in response to an external selection order in order to send the selected command to the power module.

2. A braking system according to claim 1, wherein the control module (30) is fully contained with the power module (20) in a controller or EMAC (2) distinct from a high power power supply unit (1) configured for supplying electric power needed for powering the actuators to the power module of the controller.

3. A braking system according to claim 1, wherein the control module (230) is fully contained in a high-power power supply unit (201) configured for supplying electric power needed for powering the actuators, while the power module is fully contained in a controller or EMAC (202) supplied with high power by the power supply unit.

4. A braking system according to claim 1, wherein the analog processor stage of the control module (130) is shared between a first card (135*a*) contained in a power supply unit (101) configured for supplying electric power needed for powering the actuators and a second card (135*b*) contained with the power module (120) in a controller or EMAC (102) that is supplied with high electric power by the power supply unit (101), said controller or EMAC (102) further containing the digital stage (131) of the control module (130).

* * * * *